(12) United States Patent
Fukuta et al.

(10) Patent No.: US 9,706,464 B2
(45) Date of Patent: Jul. 11, 2017

(54) COMMUNICATION CONTROL METHOD, USER TERMINAL, AND PROCESSOR

(71) Applicant: KYOCERA CORPORATION, Kyoto (JP)

(72) Inventors: Noriyoshi Fukuta, Yokohama (JP); Kugo Morita, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 11 days.

(21) Appl. No.: 14/779,747

(22) PCT Filed: Mar. 26, 2014

(86) PCT No.: PCT/JP2014/058652
§ 371 (c)(1),
(2) Date: Sep. 24, 2015

(87) PCT Pub. No.: WO2014/157396
PCT Pub. Date: Oct. 2, 2014

(65) Prior Publication Data
US 2016/0080996 A1 Mar. 17, 2016

Related U.S. Application Data

(60) Provisional application No. 61/805,789, filed on Mar. 27, 2013.

(51) Int. Cl.
*H04W 36/16* (2009.01)
*H04W 4/06* (2009.01)
(Continued)

(52) U.S. Cl.
CPC ........... *H04W 36/16* (2013.01); *H04L 12/189* (2013.01); *H04W 4/06* (2013.01); *H04W 48/18* (2013.01);
(Continued)

(58) Field of Classification Search
CPC ....... H04W 36/16; H04W 4/06; H04W 48/18; H04W 52/0225; H04W 56/00
See application file for complete search history.

(56) References Cited

U.S. PATENT DOCUMENTS

2009/0274122 A1* 11/2009 Wu ..................... H04W 76/064
370/331
2011/0230220 A1* 9/2011 Chen .................. H04W 76/064
455/507

FOREIGN PATENT DOCUMENTS

EP 1 505 782 A2 2/2005

OTHER PUBLICATIONS

International Search Report issued in Application No. PCT/JP2014/058652, mailed Apr. 28, 2014.
(Continued)

*Primary Examiner* — Ronald B Abelson
(74) *Attorney, Agent, or Firm* — Studebaker & Brackett PC

(57) ABSTRACT

A communication control method according to the present invention is a method for receiving an MBMS service. a communication control method comprises: a step A of transmitting to the first cell, by a UE 100 in a connected state in cell A belonging to PLMN 1, information for transitioning from the connected state to an idle state, when it is determined that an MBMS service in which UE 100 is interested is distributed through PLMN 2; and a step B of receiving, by UE 100 that has transitioned from connected state to idle state, MBMS service from cell B, after reselecting cell B belonging to PLMN 2.

5 Claims, 5 Drawing Sheets

(51) Int. Cl.
  *H04W 48/18* (2009.01)
  *H04W 52/02* (2009.01)
  *H04W 56/00* (2009.01)
  *H04L 12/18* (2006.01)
  *H04W 88/06* (2009.01)

(52) U.S. Cl.
  CPC ....... *H04W 52/0225* (2013.01); *H04W 56/00* (2013.01); *H04W 88/06* (2013.01); *Y02B 60/50* (2013.01)

(56) References Cited

OTHER PUBLICATIONS

Written Opinion issued in Application No. PCT/JP2014/058652, mailed Apr. 28, 2014.
3GPP TS 36.300 V11.4.0 (Dec. 2012) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11).
Extended EP Search Report dated Oct. 26, 2016 from corresponding EP Appl No. 14772947.9, 13 pp.

* cited by examiner

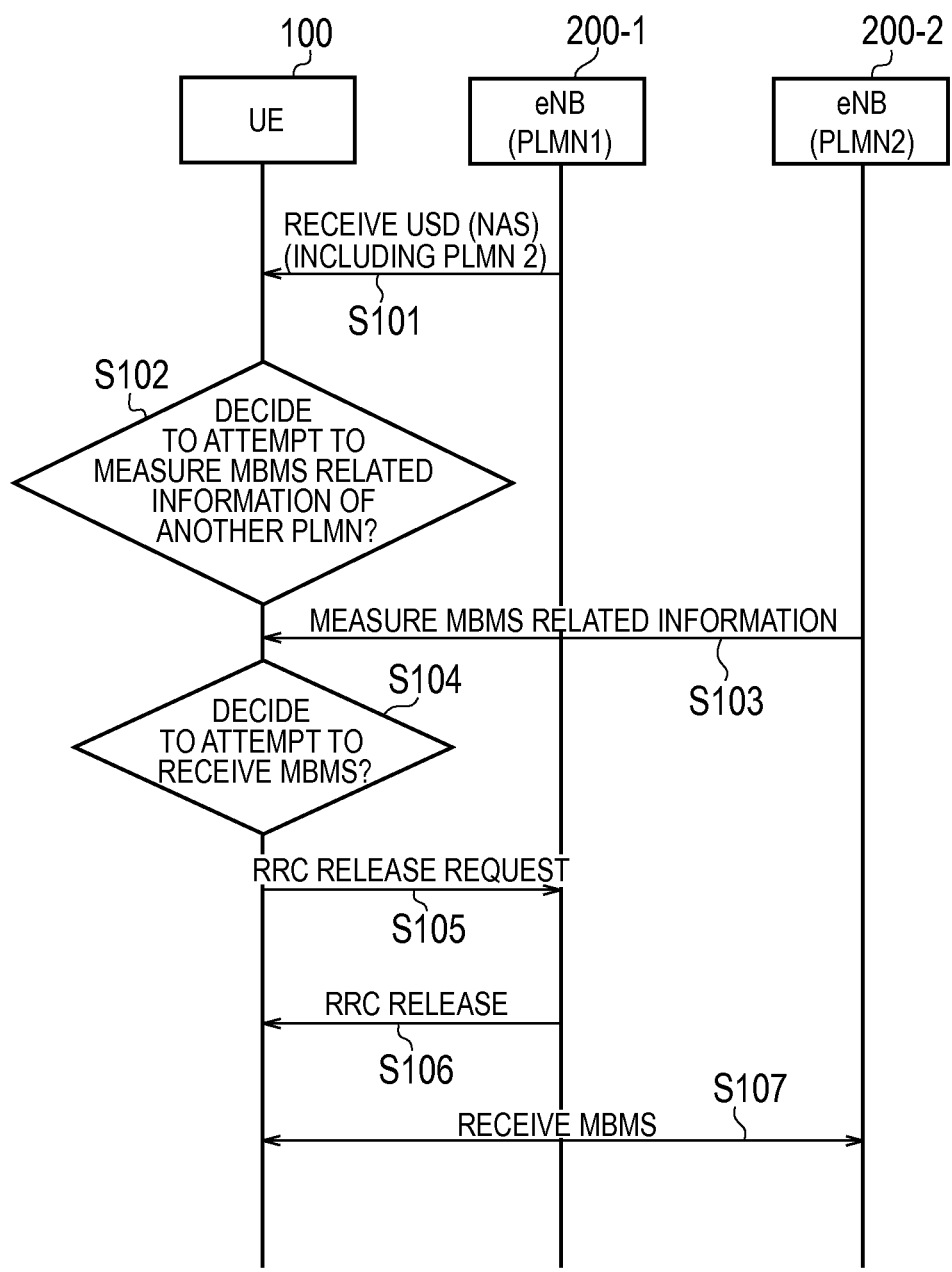

COMMUNICATION CONTROL METHOD, USER TERMINAL, AND PROCESSOR

TECHNICAL FIELD

The present invention relates to a communication control method for receiving an MBMS service, and a user terminal, and a processor.

BACKGROUND ART

In 3GGP (3rd Generation Partnership Project), which is a project aiming to standardize a mobile communication system, standardization for MBMS (Multimedia Broadcast Multicast Service) is under way (for example, see Non Patent Literature 1).

Further, there may be a plurality of public land mobile networks (PLMNs) that support MBMS. Each PLMN may be a network different in operator (communication provider), and may be a network different in radio access technology (RAT).

PRIOR ART DOCUMENT

Non-Patent Document

[Non Patent Literature 1] 3GPP Technical Report "TS 36.300 V11.4.0" December 2012

SUMMARY OF THE INVENTION

However, there is a problem that when the MBMS service in which the user terminal is interested is distributed from PLMN different from PLMN selected by the user terminal, the user terminal is not capable of receiving the MBMS service.

Therefore, the present invention provides a communication control method with which it is possible to receive an MBMS service distributed from PLMN different from a selected PLMN, a user terminal thereof, and a processor thereof.

A communication control method according to the present invention is a method for receiving an MBMS service. The communication control method comprises: a step A of transmitting to a first cell belonging to a first PLMN, by a user terminal in a connected state in the first cell, information for transitioning from the connected state to an idle state, when it is determined that an MBMS service in which the user terminal is interested is distributed through a second PLMN; and a step B of receiving, by the user terminal that has transitioned from the connected state to the idle state, the MBMS service from a second cell belonging to the second PLMN, after reselecting the second cell.

BRIEF DESCRIPTION OF THE DRAWINGS

FIG. 7 is an operation sequence diagram according to the embodiment.

DESCRIPTION OF EMBODIMENT

Summary of the Embodiment

Figure 1:
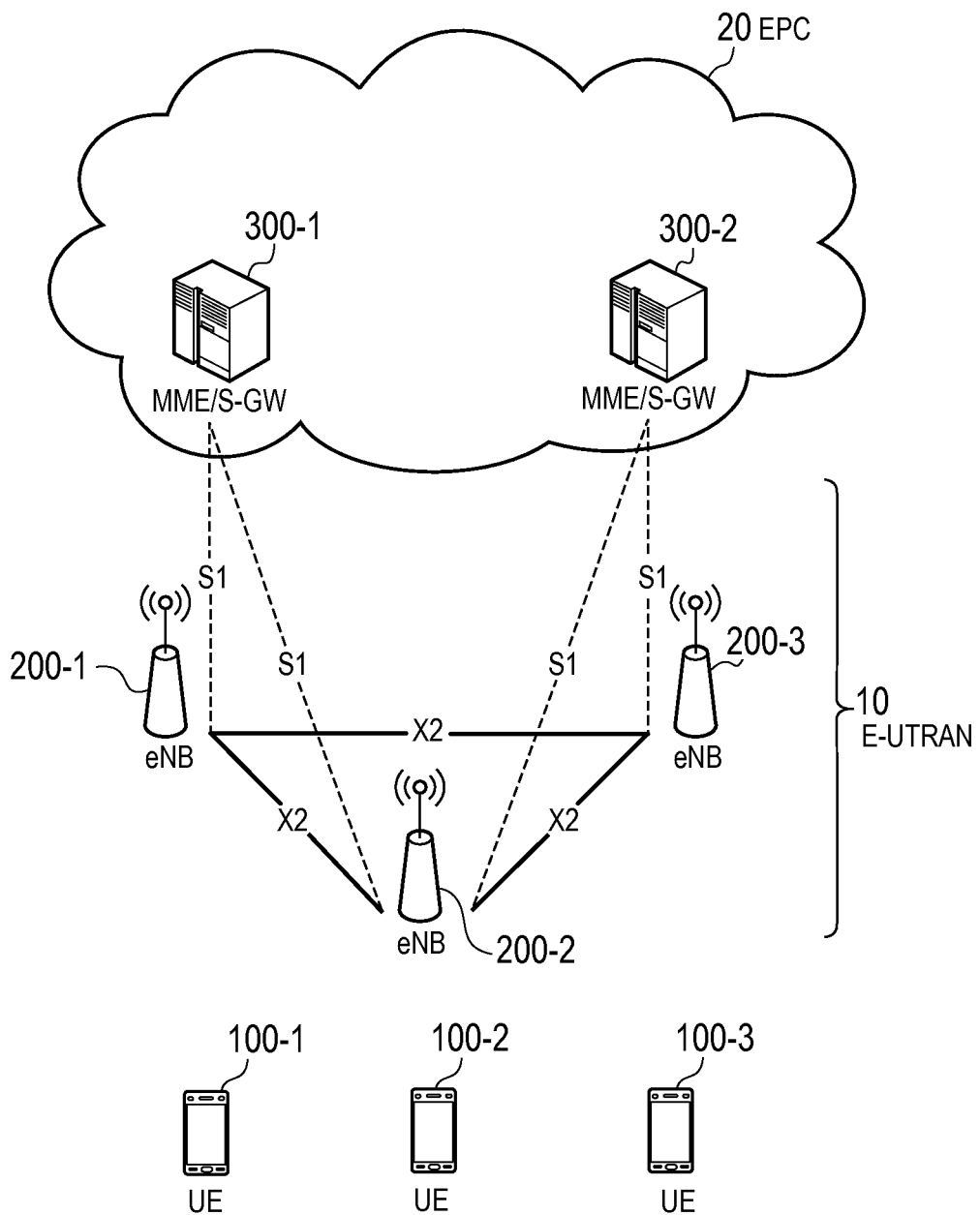
FIG. 1 is a configuration diagram of an LTE system according to the embodiment.

A communication control method according to the embodiment is a method for receiving an MBMS service. The communication control method comprises: a step A of transmitting to the first cell, by a user terminal in a connected state in a first cell belonging to a first PLMN, information for transitioning from the connected state to an idle state, when it is determined that an MBMS service in which the user terminal is interested is distributed through a second PLMN; and a step B of receiving, by the user terminal that has transitioned from the connected state to the idle state, the MBMS service from the second cell, after reselecting the second cell belonging to the second PLMN.

In the embodiment, the step A comprises: a step A1 of receiving, by the user terminal from the first PLMN, MEMS basis information on an MBMS service distributed through the second PLMN; a step A2 of receiving, by the user terminal from the second PLMN, MBMS detailed information on the MBMS service distributed through the second PLMN on the basis of the MBMS basis information; and a step A3 of determining, by the user terminal, that an MBMS service in which the user terminal is interested is distributed through the second PLMN, on the basis of the MBMS detailed information.

In the embodiment, in the step A, the user terminal transmits to the first cell, an RRC connection release request, as information for transitioning from the connected state to the idle state.

In the embodiment, in the step A, the user terminal transmits to the first cell, an MBMS interest indication including frequency information and priority information, as information for transitioning from the connected state to the idle state. The frequency information indicates that there is no frequency at which an MBMS service which is received by the user terminal or in which the user terminal is interested is distributed. The priority information indicates that reception of the MBMS service is preceded over reception of a unicast service.

A user terminal according to the embodiment supports MBMS. The user terminal comprises: a controller configured to transmit to a first cell belonging to a first PLMN, information for transitioning from a connected state to an idle state, when the user terminal is in the connected state in the first cell and when it is determined that an MBMS service in which the user terminal is interested is distributed through a second PLMN, wherein the controller reselects a second cell belonging to the second PLMN after being transitioned from the connected state to the idle state, and receives the MBMS service from the second cell.

A processor according to the embodiment is provided in a user terminal that supports MBMS. The processor executes: a process A of transmitting to a first cell belonging to a first PLMN, information for transitioning from a connected state to an idle state, when the user terminal is in the connected state in the first cell and when it is determined that an MBMS service in which the user terminal is interested is distributed through a second PLMN; and a process B of reselecting a second cell belonging to the second PLMN after being transitioned from the connected state to the idle state, and receiving the MBMS service from the second cell.

Embodiment

Hereinafter, with reference to the accompanying drawings, a description will be provided for an embodiment in a case where the present invention is applied to an LTE (Long Term Evolution) system which is one of the mobile communication systems configured to comply with the 3GPP standards.

(Configuration of LTE System)

FIG. 1 is a configuration diagram of an LTE system according to the present embodiment. As illustrated in FIG. 1, the LTE system includes a plurality of UEs (User Equipment) 100, E-UTRAN (Evolved-UMTS Terrestrial Radio Access Network) 10, and EPC (Evolved Packet Core) 20. The E-UTRAN 10 corresponds to a radio access network and the EPC 20 corresponds to a core network. The E-UTRAN 10 and the EPC 20 configure a network of the LTE system.

The UE 100 is a mobile communication device and performs radio communication with a connected cell (serving cell). The UE 100 corresponds to the user terminal.

The E-UTRAN 10 includes a plurality of eNBs 200 (evolved Node-B). The eNB 200 corresponds to a base station. Each eNB 200 manages one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes a plurality of MME (Mobility Management Entity)/S-GWs (Serving-Gateway) 300. The MME is a network node for performing various mobility controls and the like for the UE 100 and corresponds to a controller. The S-GW is a network node that performs transfer control of user data and corresponds to a mobile switching center. The EPC 20 including the MME/S-GW 300 accommodates the eNB 200.

The eNBs 200 are connected to one another via an X2 interface. Furthermore, the eNB 200 is connected to the MME/S-GW 300 via an S1 interface.

Next, the configurations of the UE 100 and the eNB 200 will be described.

Figure 2:
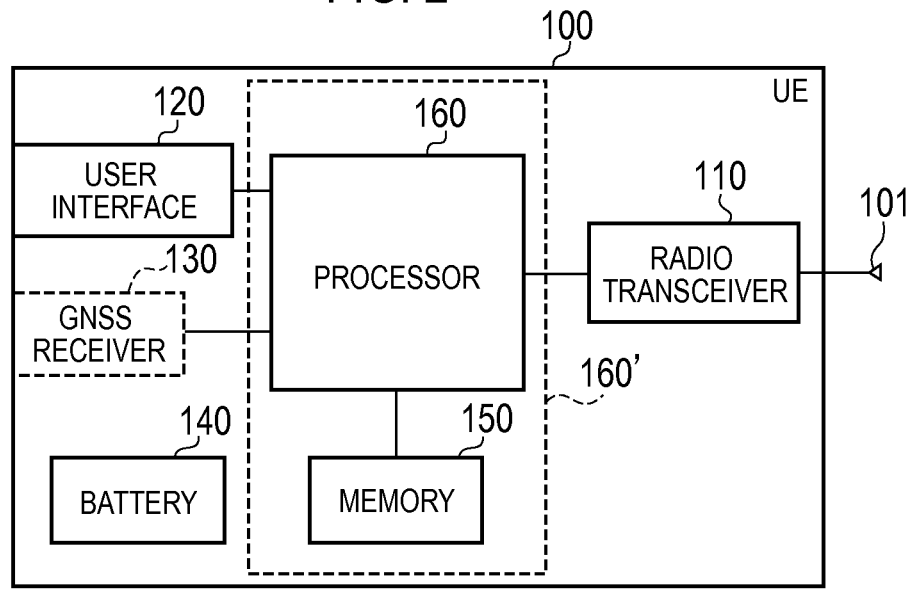
FIG. 2 is a block diagram of the UE according to the embodiment.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 configure a controller. The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various controls by executing the program stored in the memory 150. The processor 160 may further include a codec that performs encoding and decoding on sound and video signals. The processor 160 executes various controls and various communication protocols, which will be described later.

Figure 3:
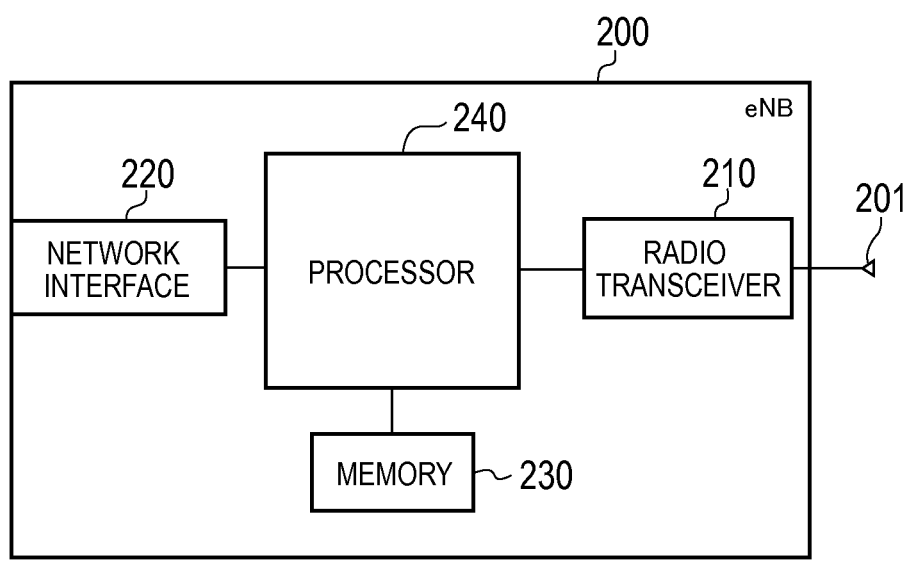
FIG. 3 is a block diagram of the eNB according to the embodiment.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a controller.

The antenna 201 and the radio transceiver 210 are used to transmit and receive a radio signal. The radio transceiver 210 converts a baseband signal output from the processor 240 into the radio signal, and transmits the radio signal from the antenna 201. The antenna 201 and the radio transceiver 210 configure a transmission unit. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various controls by executing the program stored in the memory 230. The processor 240 executes various processes and various communication protocols, which will be described later.

Figure 4:
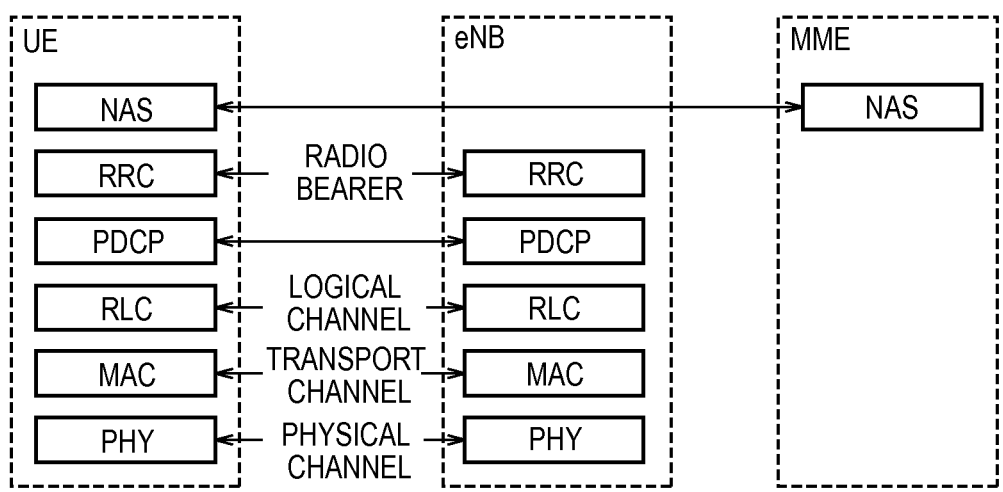
FIG. 4 is a protocol stack diagram of a radio interface in the LTE system.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes an MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size and a modulation and coding scheme (MCS)) and a scheduler for determining a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), and when there is no RRC connection, the UE 100 is in an idle state (an RRC idle state).

An NAS (Non-Access Stratum) layer positioned above the RRC layer performs session management, mobility management and the like.

Figure 5:
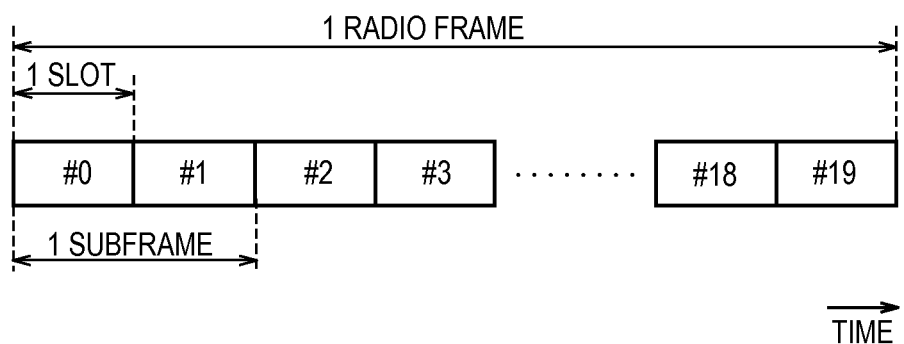
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RB) in a frequency direction, and a plurality of symbols in the time direction. The resource block includes a plurality of subcarriers in the frequency direction. Among radio resources assigned to the UE 100, a frequency resource can be specified by a resource block and a time resource can be specified by a subframe (or slot).

In the downlink, an interval of several symbols from the head of each subframe is a control region used as a physical downlink control channel (PDCCH) for mainly transmitting a control signal. Furthermore, the other interval of each subframe is a region available as a physical downlink shared channel (PDSCH) for mainly transmitting user data.

In the uplink, both ends in the frequency direction of each subframe are control regions used as a physical uplink control channel (PUCCH) for mainly transmitting a control signal. Furthermore, the central portion in the frequency direction of each subframe is a region available as a physical uplink shared channel (PUSCH) for mainly transmitting user data.

(MBMS)

MBMS is a bearer service that realizes a multicast distribution. A network is capable of improving a network efficiency and a frequency usage efficiency by simultaneously distributing an MBMS service by a common bearer to a plurality of UEs that desire to receive the MBMS service. Further, eNB configuring MBSFN (MBMS Single Frequency Network) simultaneously transmits an identical signal such that the UE is capable of performing an RF synthesis on the signal transmitted from each eNB.

As a logical channel for MBMS, MTCH (Multicast Traffic Channel) and MCCH (Multicast Control Channel) are defined. Further, as a transport channel for MBMS, MCH (Multicast Channel) is defined. The eNB 200 distributes an MBMS service and MBMS control information for controlling a distribution of the MBMS service, via a multicast channel (MTCH and MCCH).

It is noted that the MBMS is supported not only in the LTE system but also in UMTS (Universal Mobile Telecommunication System).

Operation According to Embodiment

Hereinafter, an operation according to the present embodiment will be described.

Figure 6:
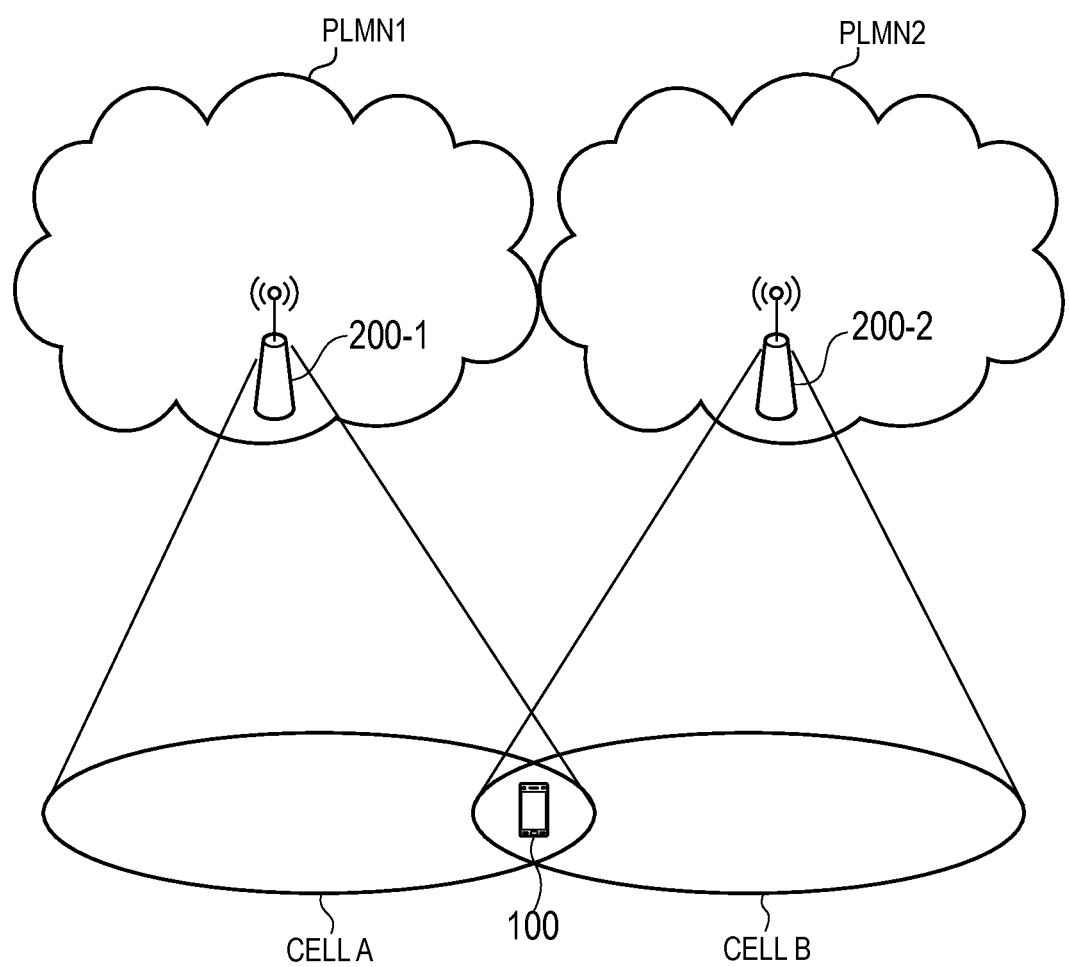
FIG. 6 is a diagram showing an operation environment according to the embodiment.

FIG. 6 is a diagram showing an operation environment according to the present embodiment. As shown in FIG. 6, there are a plurality of PLMNs that support the MBMS. The UE 100 supports a plurality of PLMNs (PLMNs 1 and 2), and performs location registration on the PLMN selected from among the plurality of PLMNs.

The PLMNs 1 and 2 are networks different in operator. That is, the PLMN 1 is a network provided by an operator 1 and the PLMN 2 is a network provided by an operator 2.

Alternatively, the PLMNs 1 and 2 are networks different in RAT. That is, the PLMN 1 is a network that complies with RAT 1 (for example, LTE), and the PLMN 2 is a network that complies with RAT 2 (for example, UMTS).

The UE 100 is located at a region where a cell A belonging to the PLMN 1 and a cell B belonging to the PLMN 2 overlap. Further, the UE 100 regards the cell A belonging to the PLMN 1, as a serving cell, and is a connected state in the cell A. The cell A is managed by an eNB 200-1 of the PLMN 1, and the cell B is managed by an eNB 200-2 of the PLMN 2.

FIG. 7 is an operation sequence diagram according to the present embodiment. The UE 100 in a connected state in the cell A may be in the process of receiving the MBMS service, or may not be receiving the MBMS service.

As shown in FIG. 7, in step S101, the UE 100 receives from the eNB 200-1 USD (User Service Description) regarding the MBMS service distributed through the PLMN 2.

The USD is configured as a message of an NAS layer (that is, an NAS message). The USD corresponds to MBMS basis information. The USD may include an identifier of the MBMS service distributed through the PLMN 2. Such a service identifier is called TMGI (Temporary Mobile Group Identifier). Further, the USD may include information indicating a distribution start time (session start time) of the MBMS service distributed through the PLMN 2 and distribution end time (session end time) of the MBMS service distributed through the PLMN 2. Further, the USD may include information indicating a frequency at which the MBMS service is distributed through the PLMN 2 and information indicating a geographical area in which the MBMS service is distributed through the PLMN 2.

In step S102, the UE 100 determines, on the basis of the USD regarding the MBMS service distributed through the PLMN 2, that there is a possibility that although the MBMS service in which the UE 100 is interested is not distributed through the PLMN 1, the MBMS service in which the UE 100 is interested is distributed through the PLMN 2. Then, the UE 100 decides to attempt to receive (measure) MBMS Service Area ID (SAI) and/or MCCH from the PLMN 2, when a signal intensity from the cell belonging to the PLMN 2 is equal to or more than a threshold value.

The SAI and/or the MCCH correspond to MBMS detailed information on the MBMS service. The SAI is an identifier indicating the geographical area in which the MBMS service is distributed. The MCCH is a logical channel through which the MBMS control information is transferred.

In step S103, the UE 100 attempts to receive the SAI and/or the MCCH from the PLMN 2 (eNB 200-2), in a period of a communication suspension (management gap, etc.) with the eNB 200-1. It is noted that when the UE 100 is provided with a plurality of receivers, it may attempt to receive the SAI and/or the MCCH from the PLMN 2 (eNB 200-2), while eliminating the measurement gap.

The UE 100 confirms that the MBMS service in which the UE 100 is interested is distributed through the PLMN 2, on the basis of the SAI and/or the MCCH.

In step S104, the UE 100 starts a process of transitioning from the connected state to an idle state in order to switch from the PLMN 1 to the PLMN 2, when reception of the MEMS service is preceded over reception of the unicast service.

In step S105, the UE 100 transmits an RRC connection release request, as information for transitioning from the connected state to the idle state, to the eNB 200-1 (cell A). The RRC connection release request is configured as a message of an RRC layer (that is, an RRC message).

In step S106, the eNB 200-1 notifies the UE 100 of a release of the RRC connection with the UE 100, in response to the reception of the RRC connection release request from the UE 100. Then, the eNB 200-1 and the UE 100 release the RRC connection. As a result, the UE 100 transitions from the connected state to the idle state.

In step S107, the UE 100 that has transitioned to the idle state reselects the cell B (eNB 200-2) belonging to the PLMN 2, and receives the MBMS service from the cell B belonging to the PLMN 2. Further, the UE 100 may transition from the idle state to the connected state in the cell B, and in the connected state, may receive the MBMS service from the cell B. Further, when the cell B (eNB 200-2) supports the reception of an MBMS interest indication, the UE 100 may transmit the MBMS interest indication to the cell B and may attempt to receive the MBMS service and to receive the unicast service.

It is noted that the MBMS interest indication is one of the RRC messages. The MBMS interest indication includes frequency information (mbms-FreqList) and priority information (mbms-Priority). The frequency information is information indicating a frequency at which the MBMS service which is received by the UE 100 or in which the UE 100 is interested is distributed. The priority information is information indicating whether reception of the MBMS service is preceded over reception of a unicast service.

As described above, even when the MBMS service in which the UE 100 is interested is distributed from the PLMN 2 different from the PLMN 1 selected by the UE 100, the UE 100 is capable of receiving the MBMS service in which the UE 100 is interested from the PLMN 2 by releasing the RRC connection and reselecting the PLMN 2.

Modification of Embodiment

In the above-described embodiment, the UE 100 transmits to the eNB 200-1 (cell A) the RRC connection release request, as the information for transitioning from the connected state to the idle state.

In the present modification, the UE 100 transmits a special MBMS interest indication to the eNB 200-1 (cell A), instead of the RRC connection release request. In the special MBMS interest indication, the frequency information is set to "empty", and the priority information is set to "priority to receiving MBMS service".

That is, in the special MBMS interest indication, the frequency information indicates that there is no frequency at which the MBMS service which is received by the UE 100 or in which the UE 100 is interested is distributed. Further, in the special MBMS interest indication, it is indicated that the reception of the MBMS service is preceded over the reception of a unicast service.

When receiving the special MBMS interest indication from the UE 100, the eNB 200-1 determines that the UE 100 is interested in an MBMS service distributed through another PLMN and releases the RRC connection with the UE 100.

Other Embodiments

The RRC connection release request according to the above-described embodiment may be applied to a purpose other than reception of the MBMS. Specifically, the RRC connection release request may be applied to a case where the RRC connection is released by an intention of the UE 100. For example, the UE 100 may transmit the RRC connection release request to the eNB 200 when device-to-device interference (LTE-GPS/WiFi) is strong in the UE 100 and thus it is desired that the LTE communication is moved to another frequency or stopped, but unfortunately, the eNB 200 does not support a InDeviceCoexIndication message, and thus, the LTE communication is unavoidably stopped.

In the above-described embodiment, a case in which the present invention is applied to the LTE system is mainly described, however, not limited thereto. The present invention may also be applied to systems other than the LTE system.

Thereby, the present invention includes various embodiments which are not described here. Furthermore, it is possible to combine the embodiments and the modifications described above. Accordingly, the technique scope of the present invention should be merely determined with reference to the matters used to specify the present invention according to the appropriate claims from the above description.

Note that the entire content of the U.S. Provisional Application No. 61/805,789 (filed on Mar. 27, 2013) is incorporated in the present application by reference.

INDUSTRIAL APPLICABILITY

According to the present invention, it is possible to provide a communication control method, a user terminal, a network device, and a base station, with which it is possible to receive an MBMS service distributed from PLMN different from a selected PLMN.

The invention claimed is:
1. A communication control method for receiving a Multimedia Broadcast Multicast Service (MBMS) service, comprising:
    receiving, by a user terminal in a connected state in a first cell belonging to a first Public Land Mobile Network (PLMN) from the first PLMN, MBMS basis information on an MBMS service distributed through a second PLMN;
    receiving, by the user terminal from the second PLMN, MBMS detailed information on the MBMS service distributed through the second PLMN on the basis of the MBMS basis information;

determining, by the user terminal, that an MBMS service in which the user terminal is interested is distributed through the second PLMN, on the basis of the MBMS detailed information;

transmitting, by the user terminal to the first cell, information for transitioning from the connected state to an idle state, in response to determining that an MBMS service in which the user terminal is interested is distributed through the second PLMN;

receiving, by the user terminal that has transitioned from the connected state to the idle state, the MBMS service from a second cell belonging to the second PLMN, after reselecting the second cell.

2. The communication control method according to claim 1, wherein
the user terminal transmits to the first cell, an RRC connection release request, as the information for transitioning from the connected state to the idle state.

3. The communication control method according to claim 1, wherein
the user terminal transmits to the first cell, an MBMS interest indication including frequency information and priority information, as the information for transitioning from the connected state to the idle state,
the frequency information indicates that there is no frequency at which an MBMS service which is received by the user terminal or in which the user terminal is interested is distributed, and
the priority information indicates that reception of the MBMS service is preceded over reception of a unicast service.

4. A user terminal that supports Multimedia Broadcast Multicast Service (MBMS), comprising:
a controller including at least one processor and at least one memory, the controller configured to:
receive, when the user terminal is in a connected state in a first cell belonging to a first Public Land Mobile Network (PLMN), from the first PLMN, MBMS basis information on an MBMS service distributed through a second PLMN;
receive from the second PLMN, MBMS detailed information on the MBMS service distributed through the second PLMN on the basis of the MBMS basis information;
determine that an MBMS service in which the user terminal is interested is distributed through the second PLMN, on the basis of the MBMS detailed information;
transmits to the first cell, information for transitioning from the connected state to an idle state, in response to determining that an MBMS service in which the user terminal is interested is distributed through the second PLMN;
reselect a second cell belonging to the second PLMN after being transitioned from the connected state to the idle state; and
receive the MBMS service from the second cell.

5. A processor provided in a user terminal that supports Multimedia Broadcast Multicast Service (MBMS), executing the processes of:
receiving, when the user terminal is in a connected state in a first cell belonging to a first Public Land Mobile Network (PLMN), from the first PLMN, MBMS basis information on an MBMS service distributed through a second PLMN;
receiving from the second PLMN, MBMS detailed information on the MBMS service distributed through the second PLMN on the basis of the MBMS basis information;
determining that an MBMS service in which the user terminal is interested is distributed through the second PLMN, on the basis of the MBMS detailed information;
transmitting to the first cell, information for transitioning from the connected state to an idle state, in response to determining that an MBMS service in which the user terminal is interested is distributed through a second PLMN;
reselecting a second cell belonging to the second PLMN after being transitioned from the connected state to the idle state; and
receiving the MBMS service from the second cell.

* * * * *